(12) United States Patent
Koide

(10) Patent No.: US 7,090,356 B2
(45) Date of Patent: Aug. 15, 2006

(54) PROJECTION TYPE IMAGE DISPLAY APPARATUS AND DISPLAY DEVICE

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/998,648

(22) Filed: Nov. 30, 2004

(65) Prior Publication Data

US 2005/0099116 A1    May 12, 2005

Related U.S. Application Data

(62) Division of application No. 10/602,879, filed on Jun. 25, 2003, now abandoned.

(30) Foreign Application Priority Data

Jul. 31, 2002  (JP) ............................. 2002-224170
Jul. 31, 2002  (JP) ............................. 2002-224210

(51) Int. Cl.
  *G03B 21/20*   (2006.01)
  *H04N 5/70*    (2006.01)
  *G02F 1/13357* (2006.01)

(52) U.S. Cl. .................... 353/85; 353/31; 348/801; 349/69

(58) Field of Classification Search ............ 353/31, 353/43, 85, 94, 121, 122; 349/69, 7; 348/800–803; 362/555, 559–561, 800; G03B 21/20; H04N 5/70
See application file for complete search history.

(56) References Cited

U.S. PATENT DOCUMENTS

| | | | |
|---|---|---|---|
| 4,995,719 A * | 2/1991 | Shanks ................... 353/122 |
| 5,353,156 A | 10/1994 | Chung ..................... 359/649 |
| 5,703,436 A | 12/1997 | Forrest et al. ........... 313/506 |
| 6,122,042 A * | 9/2000 | Wunderman et al. ...... 356/73 |
| 6,137,635 A | 10/2000 | Nakazawa ................ 359/621 |
| 6,227,669 B1 * | 5/2001 | Tiao et al. ................ 353/31 |
| 6,233,039 B1 * | 5/2001 | Yen et al. ................. 355/53 |
| 6,259,423 B1 | 7/2001 | Tokito et al. ............. 345/76 |
| 6,420,834 B1 * | 7/2002 | Yamazaki et al. ...... 315/169.3 |
| 6,507,379 B1 | 1/2003 | Yokoyama et al. ....... 349/69 |
| 6,520,649 B1 | 2/2003 | Lamvik ..................... 353/94 |
| 6,547,400 B1 * | 4/2003 | Yokoyama ................ 353/98 |
| 6,596,134 B1 | 7/2003 | Forrest et al. ......... 204/192.29 |
| 6,741,398 B1 | 5/2004 | Yasui ....................... 359/680 |
| 6,769,772 B1 * | 8/2004 | Roddy et al. ............. 353/31 |
| 6,803,991 B1 * | 10/2004 | Mori ......................... 355/53 |
| 2004/0021833 A1 * | 2/2004 | Koide ........................ 353/31 |

FOREIGN PATENT DOCUMENTS

| | | |
|---|---|---|
| JP | 11-67448 | 3/1999 |
| JP | 2000-66301 | 3/2000 |
| JP | 2000-75406 | 3/2000 |

* cited by examiner

*Primary Examiner*—W. B. Perkey
*Assistant Examiner*—Andrew Sever
(74) *Attorney, Agent, or Firm*—Fitzpatrick, Cella, Harper & Scinto

(57) ABSTRACT

A projection type image display apparatus includes an electroluminescence element which has a plurality of pixels that can each emit modulated light, a projection optical system which projects the light emitted from each of the pixels in the electroluminescence element onto an object to display an image, and a sensor which detects brightness of ambient light that illuminates the object. A controller controls brightness of the light emitted from the electroluminescence element based on the brightness of the ambient light.

11 Claims, 8 Drawing Sheets

PROJECTION TYPE IMAGE DISPLAY APPARATUS AND DISPLAY DEVICE

This is a divisional application of application Ser. No. 10/602,879, filed on Jun. 25, 2003 now abandoned.

BACKGROUND OF THE INVENTION

1. Field of the Invention

The present invention relates to a projection type image display apparatus such as a projector, etc.

2. Description of the Prior Art

A conventional projection type image display apparatus normally uses a liquid crystal panel or micro mirror device as a light modulation element for passive switching, projects a light pattern selected by controlling transmission, shielding or deflection of light onto a screen, and thereby displays the image on the screen.

When a liquid crystal panel or micro mirror device is used as a light modulation element, it is assumed that shielded light is regarded as unnecessary energy and absorbed by a polarization element or light absorption medium and eliminated. In the case of a liquid crystal, unnecessary illumination light exists due to light transmittance, aperture. efficiency of each pixel and accuracy of polarization control, and in the case of a micro mirror device, it is difficult to effectively use the pupil of an axially symmetric optical system from the standpoints of aperture efficiency of each pixel, numerical aperture of projection lenses due to oblique-incidence illumination and numerical aperture of an illumination system.

Therefore, in order to make a displayed image brighter, a metal halide or high-pressure mercury lamp is used as a light source, but there are additional problems that a high voltage needs to be used as a light source voltage and the light source produces high heat.

As a method for fundamentally solving such low efficiency of energy usage, there are proposals disclosed in Japanese Patent Laid-Open No. 1999-67448 and Japanese Patent Laid-Open No. 2000-66301. In the above-described two proposals, a luminescent panel (hereinafter referred to as "organic EL panel") on which organic electroluminescence elements (hereinafter referred to as "organic EL (electroluminescence) elements") are arranged in matrix form is used, light emission of each organic EL element of this luminescent panel is driven based on an image signal and light from each organic EL element is projected onto a display target object through a projection optical system. Since the organic EL element is a self-luminescent element, there is no need for any separate illumination light source and the organic EL panel emits pattern light including image information, therefore there is no need for a transmission type liquid crystal panel as a modulation element. Therefore, it is possible to use emitted light for displays effectively.

The organic EL element is therefore expected to be able to easily display images with lower power and high brightness without generating unnecessary light energy. Furthermore, since the organic EL panel alone can modulate and output images, the apparatus configuration is simple and it is easy to miniaturize the apparatus and reduce its weight.

However, when the organic EL panel is used as an image modulation light source for a projection type image display apparatus that enlarges an image, and projects and displays the image on an object such as a screen, it is necessary to increase the amount of light emitted from the organic EL element to a great extent compared to a case where the organic EL panel is used as a direct-view type display. That is, it is necessary to increase the amount of light emitted by increasing power energy directed to pixels arranged in the organic EL panel.

However, there is a problem that when light is emitted from the organic EL element at high brightness, the luminance efficiency of the amount of emitted light with respect to the power input reduces.

This is because increasing the amount of charge carriers injected into the luminescent layer, that is, the amount of current requires an applied voltage to be increased, and increasing the voltage is equivalent to increasing the gradient of the electric field applied to the luminescent layer. In contrast to an electroluminescent emission phenomenon in which electrons and holes remain in the luminescent layer area and excitons are formed when this gradient of the electric field increases and photons are emitted by recombination, charge carriers do not remain in the luminescent layer area, a leak current that penetrates the luminescent layer increases whereby the luminescent efficiency of the amount of light emitted with respect to the power input decreases.

To prevent charge carriers from brimming from the luminescent layer and improve the luminescent efficiency, development toward the adoption of a double-hetero potential structure is underway. However, the present situation is that the height of the potential barrier on the LUMO side of the electron blocking layer and the height of the potential barrier on the HOMO side of the hole blocking layer depend on component materials and this technology does not reach a level of sufficiently functioning with respect to the electric field gradient applied to the luminescent layer.

For this reason, rather than projecting light from the organic EL panel consisting of luminescent pixels of three primary colors arranged in a repetitive matrix form, a configuration using three organic EL panels that emit three primary colors separately, combining three color light using a wavelength-combining element such as a prism provided with a dichroic waveband separating film and projecting the combined light will reduce the amount of power required for one pixel and improve the luminescent efficiency of the amount of light emitted with respect to power input.

However, because the organic EL element generally emits non-polarized light, or due to isotropy of luminescent directivity, a separated wavelength shift characteristic depending on the angle of incidence of light upon the dichroic waveband separating film and a difference in the separated wavelength of the dichroic waveband separating film between S-polarization and P-polarization, this configuration has difficulty in combining light emitted from the organic EL elements without loss. That is, even if light from three organic EL panels that emit three color light respectively is combined, the light utilization efficiency is not equivalent to a simple sum of those.

Thus, using a layered organic EL panel which laminates three organic EL luminescent layers that emit three primary color light can reduce the amount of power input to each organic EL luminescent layer and improve the efficiency of the amount of light emitted (amount of light projected onto an object such as a screen) with respect to the amount of power input without reducing the efficiency of combining three color light.

However, when a layered organic EL panel is used, due to a shift of positions in the thickness direction of three organic EL luminescent layers, if light is projected onto an object such as a screen using a projection lens, the image forming position varies depending on the color, which causes a color-dependent blur in the image. This image blur becomes more noticeable as the projection magnification increases.

On the other hand, when a liquid crystal panel or micro mirror device is used as a light modulation element, a maximum output brightness distribution of each pixel modulated by the modulation panel depends on an illumination distribution of an illumination system that illuminates the light modulation element by transmission or reflection. Therefore, the illumination distribution is designed according to the configuration of the illumination optical system. When a gas discharge lamp using a paraboloid or spheroid mirror is used, the light beam shows an atypical Gaussian distribution and it is a general practice to convert this distribution to a uniform illumination distribution using an integrated optical system and it is difficult to use a method of providing an intentional illumination distribution other than the uniform distribution.

To solve this problem, Japanese Patent Laid-Open No. 2000-75406 proposes a method of providing a brightness distribution for a panel-shaped surface luminescent type light source that illuminates the light modulation panel to compensate for the reduction in the amount of light transmitted outside the optical axis of a projection lens in order to intentionally make illumination of the screen which is a projection target object uniform.

As the panel-shaped surface luminescent type light source, an electroluminescence type fluorescent luminous body light source or charge-injection type organic EL element is used. The above-described publication describes it as a light source that illuminates a light modulation element using a liquid crystal panel or micro mirror device, but similar effects are also attained even if the light source itself is a light modulation element.

However, the organic EL element has a problem with durability that the photoelectric conversion efficiency decreases gradually. This is because the organic luminescent material itself changes a chemical structure, repeats emissions of light energy according to the displacement of its potential energy and the organic luminescent layer is structured in such a way that a fluorescent or phosphorescent luminescent material, a material to disperse this material and a material to improve an electrical conductive characteristic are mixed, and therefore the probability that the organic luminescent material that changes its chemical structure and emits light will change to any forms other than a desired one does not become 0% in principle because the state distribution function is dispersed at a temperature equal to or higher than absolute zero.

The speed at which the luminescent material changes to any form other than the desired form is affected by the stability of the state of the material, combination with the binder environment medium material, intensity of the applied electric field and hydrolysis by a humidity environment, etc. A main factor for deterioration concerning the speed of chemical reaction is considered to be acceleration of deterioration by a self temperature rise parameter due to generation of thermal energy in the process of photoelectric conversion. This speed of deterioration becomes accelerated reaction almost in accordance with Arrhenius' reaction rate relational equation.

Therefore, if the system is driven to emit light at a low temperature with low power input, the speed of variation in the photoelectric conversion efficiency slows down and its life is extended, but when the power supplied is increased in order to increase brightness of light emissions, the photoelectric conversion efficiency decreases exponentially.

Therefore, assuming that a quality assurance period for a normal consumer product is one year, stable light emission for several thousands to several tens of thousands of hours is required. Attempting to provide clearer images of higher quality results in reduced stability in quality.

Furthermore, in a situation in which a projection type image display apparatus is used, an object such as a screen onto which an image is projected is placed in an illuminated environment in a room or place and the image is observed when an observer recognizes the diffused light from the object, and therefore it is a general practice to darken the illumination environment in which the object such as a screen is illuminated in order to enhance black-and-white contrast of the projected image. Movie projection is one of the typical examples.

On the other hand, when images for a presentation is displayed, illumination at hand is required to allow audience to refer to documents or take notes, and therefore the system may be used in a certain illumination environment. Thus, the operating environment of the projection type image display apparatus varies depending on the purpose.

Furthermore, while it is more important to display images more clearly in a bright operating environment, the image quality such as uniformity in the brightness of the image, clearness of contrast, or color reproducibility, etc., becomes more important.

SUMMARY OF THE INVENTION

It is an object of the present invention to provide a projection type image display apparatus capable of suppressing power input to each luminescent layer of a layered electroluminescence element, keeping high luminance efficiency and providing image projection at high brightness.

It is another object of the present invention to provide a projection type image display apparatus capable of controlling an electroluminescence element according to the brightness of the environment in which the system is used and keeping the quality of the projected image for a long time.

In order to attain the above objects, the projection type image display apparatus of the present invention includes an electroluminescence element with three luminescent layers emitting three primary colors layered and a projection optical system that projects the light emitted from the electroluminescence element onto an object and displays an additive color mixture image. Each of the luminescent layers has emission pixels arranged in a two-dimensional matrix form and emits an image modulation pattern light including an intensity distribution of various colors according to an input signal based on image information. Then, the projection optical system has axial chromatic aberration in such a way that the positions of the plane of the each luminescent layer and the plane of the object have an optically conjugate relationship with respect to an emission intensity median point wavelength of the waveband of each color.

Furthermore, the projection type image display apparatus of the present invention includes an electroluminescence element having a plurality of pixels which can be modulated individually and a projection optical system that projects the light emitted from the pixels in the electroluminescence element onto an object to display an image. It further includes a sensor that detects brightness of ambient light that illuminates the object and a controller that controls the brightness of light emissions of the electroluminescence element based on the brightness detected by the sensor.

The features of the projection type image display apparatus and image display system of the present invention will become more apparent by reference to the following detailed description of the invention taken in conjunction with the accompanying drawings.

DETAILED DESCRIPTION OF THE PREFERRED EMBODIMENTS

With reference now to the attached drawings, embodiments of the present invention will be explained below.

Embodiment 1

Figure 1:
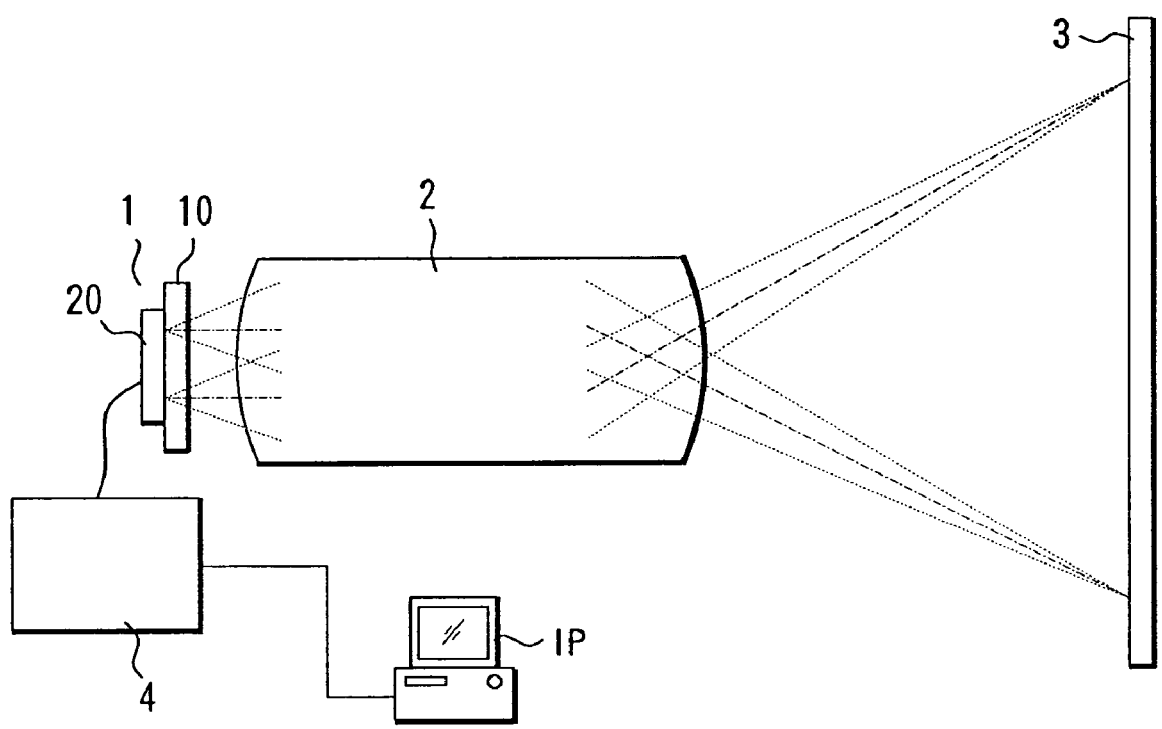
FIG. 1 is a sectional view of a main optical system of a projector according to Embodiment 1 of the present invention.

FIG. 1 is a sectional view of a main optical system of a projector (projection type image display apparatus) according to Embodiment 1 of the present invention.

Reference numeral 1 denotes an organic electroluminescence (EL) element that emits light including image information. This EL element 1 has a plurality of pixels that emits image information as light pattern information.

Reference numeral 10 denotes a glass substrate that holds a film structure of the EL element 1.

Reference numeral 4 denotes a controller made up of a CPU, etc., which electrically controls the EL element 1 according to image signals from an image signal providing apparatus IP such as a personal computer, DVD player, VCR, video camera, TV, unit of an antenna that receive image signals and a tuner. The EL element 1 emits light patterned based on the electrical signal from the controller 4.

The light emitted from the EL element 1 is captured by a projection lens 2 and projected onto a screen 3. The surface of the screen 3 has a light diffusion characteristic and the observer can recognize the image by viewing the light diffused and reflected by this screen 3.

The screen 3 may be either of the above-described reflective type or a transmission type. In both cases, using the screen having at least a predetermined diffusion characteristic, the apparatus can function as a display apparatus which recognizes the image by directly viewing the screen 3.

Figure 2:
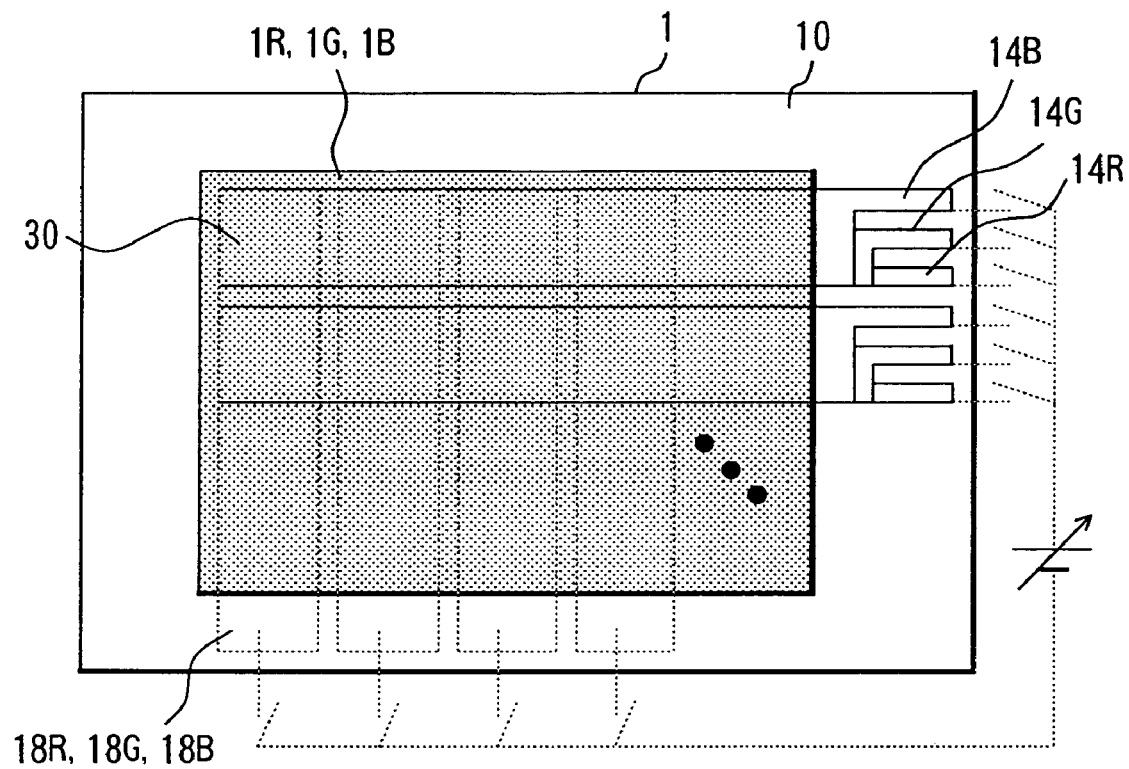
FIGS. 2(A) and 2(B) are schematic views of main parts of an EL element used in Embodiment 1.
Figure 2:
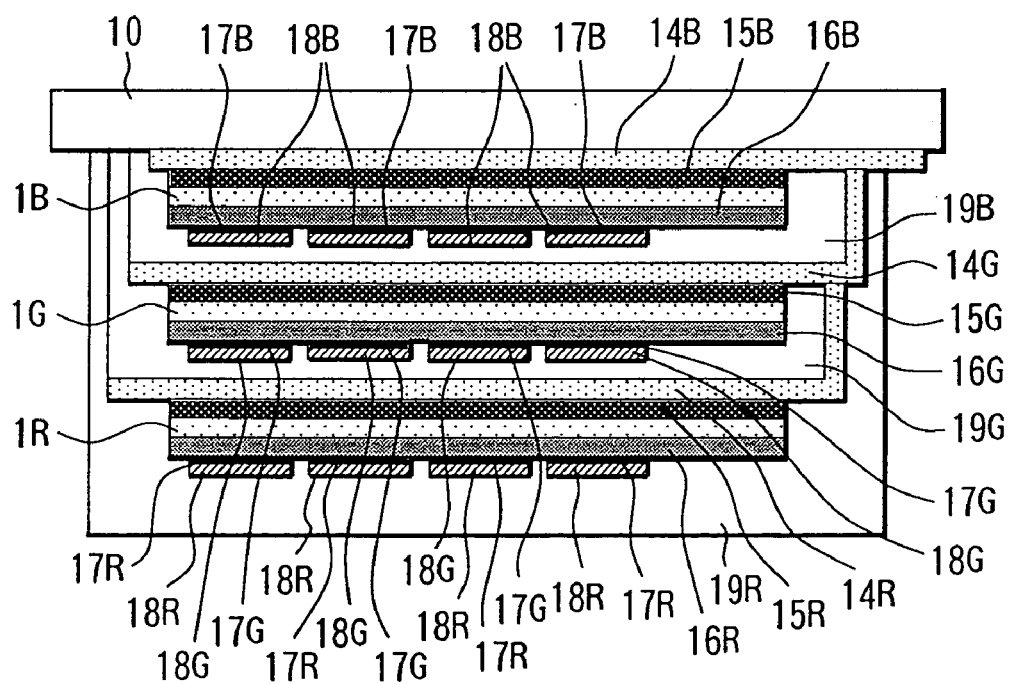

Then, the structure of the EL element 1 used in this embodiment will be explained using FIGS. 2(A) and 2(B). The basic structure of the EL element 1 is as follows. First, as shown in FIG. 2(B), on a transparent glass substrate 10 as the base material, a blue hole transport transparent thin film electrode 14B made of ITO (indium-tin oxide) which serves as an anode electrode is wiring-patterned in the horizontal direction in the figure as shown in FIG. 2(A). On the blue hole transport transparent thin film electrode 14B, a blue hole transport layer 15B made up of α-NPD that carries only positive charges (holes) is placed. Furthermore, on the blue hole transport layer 15B, a luminescent layer 1B that emits blue light made of a material consisting of a CBP charge derivative host which emits blue light doped with an Flrpic luminous body guest is placed and a blue electron transport layer 16B made of BCP that transports only negative charges (electrons) is placed on top of it. Then, on top of it, a blue thin film metal electrode 17B of several tens of angstrom in thickness made of an alloy of Mg and Ag having high electron mobility is wiring-patterned in a direction perpendicular to the wiring direction of the blue hole transport transparent thin film electrode 14B in the longitudinal direction of the figure as shown in FIG. 2(A). On top of it, a blue electron transport transparent thin film 18B made of ITO as an electron buffer layer is further patterned in a shape equivalent to that of the blue thin film metal electrode 17B and its entire area is covered with a blue insulator protective layer 19B made of silicon nitride, etc.

On top of this blue film structure, a green film structure and red film structure are constructed and layered in the same way. The green film structure is constructed of (starting from the blue film structure side) a green hole transport transparent thin film electrode 14G made of patterned ITO as shown in FIG. 2(A), a green hole transport layer 15G made of α-NPD that carries only positive charges (holes), a luminescent layer 1G that emits green light made of a material consisting of a CBP charge derivative host emitting green light doped with an Ir(ppy)$_3$ luminous body guest, a green electron transport layer 16G made of BCP that carries only negative charges (electrons), a green thin film metal electrode 17G of several tens of angstrom in thickness made of an alloy of Mg and Ag of high electron mobility patterned as shown in FIG. 2(A), a green electron transport transparent thin film 18G made of ITO that serves as an electron buffer layer patterned as shown in the same figure and a green insulator protective layer 19G made of silicon nitride, etc., covering the entire area.

Furthermore, the red film structure is constructed of (starting from the green film structure side) a red hole transport transparent thin film electrode 14R made of patterned ITO as shown in FIG. 2(A), a red hole transport layer 15R made of α-NPD that carries only positive charges (holes), a luminescent layer 1R that emits red light made of a material consisting of a CBP charge derivative host emitting red light doped with a Btp$_2$Ir(acac) luminous body guest, a red electron transport layer 16R made of BCP that carries only negative charges (electrons), a red thin film metal electrode 17R of several tens of angstrom in thickness made of an alloy of Mg and Ag of high electron mobility patterned as shown in FIG. 2(A), a red electron transport transparent thin film 18R made of ITO that serves as an electron buffer layer patterned as shown in the same figure and a red insulator protective layer 19R made of silicon nitride, etc., covering the entire area.

The film structure from the blue hole transport transparent thin film electrode 14B to the blue electron transport transparent thin film 18B, the film structure from the green hole transport transparent thin film electrode 14G to the green electron transport transparent thin film 18G and the film structure from the red hole transport transparent thin film electrode 14R to the red electron transport transparent thin film 18R have structures independent of one another from the standpoint of the electric field.

Each color film structure is provided with hole transport layers (15R, 15G, 15B) to efficiently inject hole carriers into the luminescent layers (1R, 1G, 1B) and to shield and block electron carriers and electron transport layers (16R, 16G, 16B) to efficiently inject electron carriers into the luminescent layers (1R, 1G, 1B) and to shield and block hole carriers. That is, the luminescent layer is sandwiched by a double-hetero structure from the standpoint of energy potential.

The hole transport layers (15R, 15G, 15B) are supplied with hole carriers from the hole transport transparent thin film electrodes (14R, 14G, 14B) made of ITO of the anode electrode. On the other hand, the electron transport layers (16R, 16G, 16B) are supplied with electrons as a buffer layer of electron carriers from the electron transport transparent thin films (18R, 18G, 18B) made of ITO used as cathode electrodes through the thin film metal electrodes (17R, 17G, 17B) of high electron mobility whose light transmittance has been increased by forming it of an ultra-thin film of several tens of angstrom in thickness because ITO has low electron mobility.

Thus, charge carriers of holes and electrons are injected into the luminescent layers (1R, 1G, 1B), electric field carriers are transported through the CBP charge derivative and excitons are formed. Then, when these excitons are recombined, photons are generated causing emission and light emission.

This is the basic structure of the EL element 1. Each of the emission pixels 30 is constructed of a wiring matrix arrangement of the hole transport transparent thin film electrodes 14R, 14G and 14B and electron transport transparent thin film electrodes 18R, 18G and 18B. The luminescent materials, red emitting $Btp_2Ir(acac)$ luminous body guest, green emitting $Ir(ppy)_3$ luminous body guest and blue emitting Flrpic luminous body guest are phosphorescent materials that emit light through triplet state excitons.

The EL element 1 that expresses full colors are realized when light of each color is radiated toward the glass substrate 10 in the above-described layered structure.

Furthermore, to increase the amount of light emitted toward the glass substrate 10, a dielectric light interference multilayer film or reflective mirror layer may be further provided on the red insulator protective layer 19R.

However, display colors need to be tuned in response to input image signals in order to produce photoluminescent emission at a certain probability when photons emitted from the luminescent layer 1B that emits blue light are absorbed by the luminescent layer 1G that emits green light and luminescent layer 1R that emits red light and in order to produce photoluminescent emission at a certain probability when photons emitted from the luminescent layer 1G that emits green light are absorbed by the luminescent layer 1R that emits red light.

This embodiment uses an iridium complex as a luminescent material for the luminescent layer and uses a type of the iridium complex whose potential energy gap has been changed by molecules obtained by substituting a part of ligands of the complex structure or molecules obtained by substituting terminal atoms for an emission wavelength.

The red emitting $Btp_2Ir(acac)$ luminous body guest, green emitting $Ir(ppy)_3$ luminous body guest and blue emitting Flrpic luminous body guest are guests with replaced ligands.

For the phosphorescent material used here, light emission is started with pulse injection into charge carriers and the time after peak light emission until the light emission is attenuated to a half amount of light emission is 1 millisecond or less at the longest. The light emission delay attenuation time of a phosphorescent material using an iridium complex also changes depending on the film thickness of the luminescent layer. When the film thickness of the luminescent layer is assumed to be approximately 30 nm, phosphorescence takes place in an emission half attenuation time of 10 microseconds or less.

Here, if a phosphorescent material or element configuration whose phosphorescent emission half attenuation time is by far longer than 1 millisecond, producing such a large light emission delay as to exceed 10 milliseconds is used, it will take a time of several tens of milliseconds until the light goes off, which is recognized as an afterimage in terms of visual recognition. When a moving image is displayed, this causes a problem of a so-called movement tailing phenomenon. Therefore, it is preferable to use a phosphorescent material or element configuration whose phosphorescent emission half attenuation time is shorter than 1 millisecond.

On the other hand, since the phosphorescent light emitted from an excited triplet state has quantum conversion efficiency theoretically four times that of fluorescent light emitted from an excited singlet state, a larger amount of emission can be converted with respect to the supplied electric power, providing high luminance efficiency. Therefore, using the EL element 1 using a phosphorescent material as the modulation light source of the projector makes it possible to obtain a clear display more easily, which is effective in improving the quality of the projector.

Figure 3:
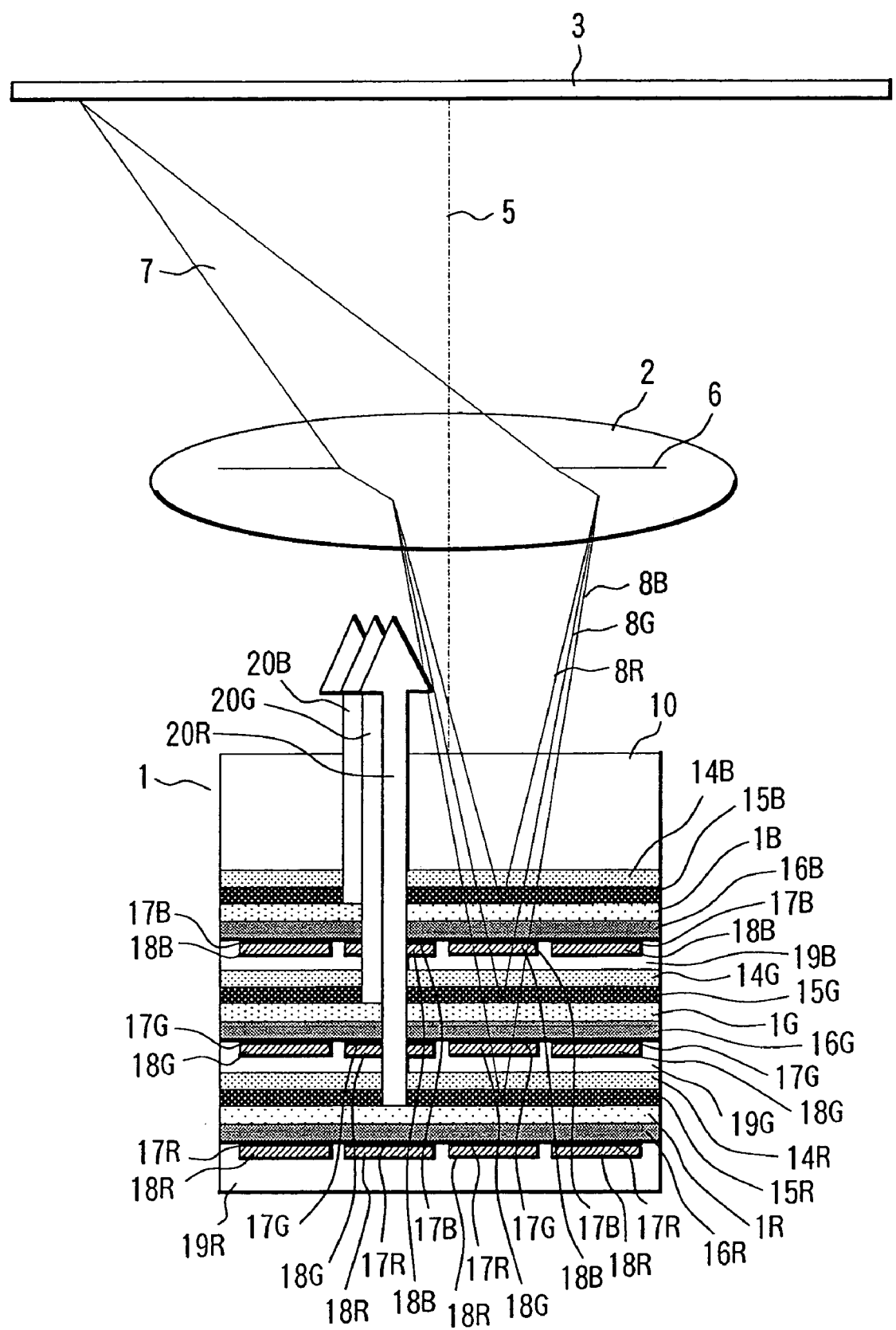
FIG. 3 is a schematic view showing an image formation relationship of a projection lens used in Embodiment 1.

Then, a case where a projection lens 2 is provided with axial chromatic aberration in such a way that the positions of the plane of the respective luminescent layers (1R, 1G, 1B) that emit three primary colors (light beams) of blue, green and red and the plane of the screen which is the plane of the object onto which an image is projected have an optically conjugate relationship with respect to an emission intensity median point wavelength of the wavebands of the respective colors will be explained using FIG. 3.

FIG. 3 shows how pattern emitted light emitted from the EL element 1 is projected onto the screen 3 through a diaphragm 6 of the projection lens 2. The light emitted from the luminescent layer 1R that emits red light of the EL element 1 passes through all transparent layers on the glass substrate 10 side and is radiated upward in the figure. At this time, the luminescent layer 1G that emits green light and the luminescent layer 1B that emits blue light have potential band gap energy greater than photon energy of the red color, and therefore no absorption occurs. Likewise, the light emitted from the luminescent layer 1G that emits green light passes through all transparent layers on the glass substrate 10 side and is radiated upward in the figure. At this time, the luminescent layer 1B that emits blue light has potential band gap energy greater than photon energy of the red color, and therefore no absorption occurs. That is, red, green and blue beams are radiated overlapping with one another.

On the other hand, the projection lens 2 has an axially symmetric structure with respect to the optical axis 5 and because of the design with light wavelength dispersion of various component lenses (not shown), axial chromatism is set according to the inter-plane distance of the luminescent layers (1R, 1G, 1B) so that the focus length of the red wavelength is the largest, followed by the focus length of the green wavelength and the focus length of the blue.

With respect to the median point wavelength of the amount of light emitted of the waveband of the light emitted from the respective luminescent layers (1R, 1G, 1B), the emission planes of the luminescent layer 1R that emits red light, the luminescent layer 1G that emits green light and the luminescent layer 1B that emits blue light have an optically conjugate relationship with the image projection plane of the screen 3. That is, blue beams 8B, green beams flux 8G and red beams flux 8R on the side of the light incident upon the projection lens 2 are designed to be combined and concentrated into beams 7 on the side on which light is emitted from the projection lens 2.

In this way, red, green and blue beams are focused and overlap with one another on the image projected on the light diffusing type screen 3, which prevents deterioration of resolution of the image by colors and allows a sharp (clear), high resolution image to be displayed.

As explained above, this embodiment allows the image formation positions of red, green and blue beams emitted from the three luminescent layers (1R, 1G, 1B) to match on the screen 3, and can thereby suppress color-dependent blurs of images. In addition, it reduces power input to each luminescent layer of the EL element, and can thereby maintain high brightness emission with high luminance efficiency and keep an object such as a screen in a high projection illumination state for a long time.

The configuration shown in Embodiment 1 is not limited to a projector, but also applicable to a head mounted display or head up display, etc., used to observe virtual images of an EL element.

Embodiment 2

Figure 4:
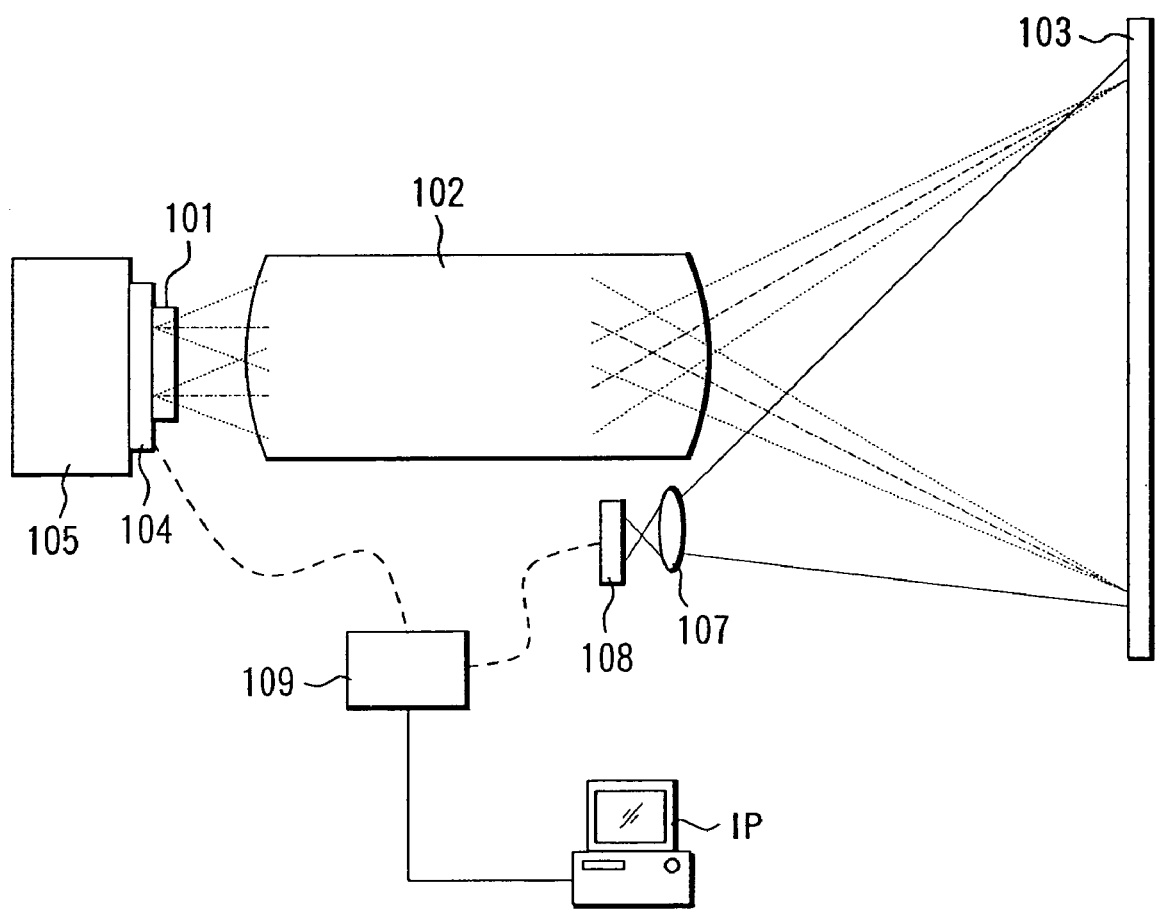
FIG. 4 is a sectional view of a main optical system of a projector which is Embodiment 2 of the present invention.

FIG. 4 is a sectional view of a main optical system of a projector which is Embodiment 2 of the present invention.

Reference numeral 101 denotes an organic electroluminescence (EL) element that radiates light including image information. This EL element 101 has a plurality of pixels that radiate image information as optical pattern information. A detailed configuration of the EL element 101 will be explained later.

Reference numeral 109 denotes a controller made up of a CPU, etc., which electrically controls the EL element 101 according to image signals from an image signal providing apparatus IP such as a personal computer, DVD player, VCR, video camera, TV, unit of an antenna that receive image signals and tuner (the same will apply to Embodiment 3 below though not shown). The EL element 101 emits light patterned based on the electrical signal from the controller 109.

The light emitted from the EL element 101 is captured by a projection lens 102 and projected onto a screen 103. The surface of the screen 103 has a light diffusion characteristic and the observer can recognize the image by viewing the light diffused and reflected by this screen 103.

The screen 103 may be either of the above-described reflective type or a transmission type. In both cases, using the screen having at least a predetermined diffusion characteristic, the apparatus can function as a display apparatus which recognizes the image by directly viewing the screen 103.

On the other hand, at the EL element 101, energy corresponding to energy conversion loss in a photoelectric conversion is mostly converted to thermal energy, and therefore a Peltier element 104 is placed on the back of the EL element 101. When electric power is supplied, the Peltier element 104 generates a temperature gradient based on the Seebeck effect and can perform cooling action on its one side. The EL element 101 is cooled by contacting the low temperature gradient surface of this Peltier element 104 with the back of the EL element 101. A thermocouple (not shown) is provided in contact with the element 101 and the controller 109 performs temperature control (that is, control over power to the Peltier element 104) while monitoring the temperature detected by the thermocouple.

Furthermore, the high temperature gradient surface of the Peltier element 104 which is not in contact with the EL element 101 is subjected to air-cooling by a ventilation fan 105 with air at a room temperature.

A condensing lens 107 is provided near the projection lens 102 and this condensing lens 107 condenses the ambient light illuminating the screen 103 onto a photoelectric conversion sensor 108 before the projector projects an image onto the screen 103. The output of the photoelectric conversion sensor 108 which indicates ambient illumination of the ambient light is sent to the controller 109 and stored as ambient illumination data. Based on this ambient illumination data, the controller 109 controls total maximum light emission brightness of the EL element 101 and maximum light emission brightness distribution of each pixel arranged in the EL element 101. The more specific control method will be explained later.

Furthermore, it is also possible to detect ambient illumination simultaneously with image projection onto the screen 103 by the projector by partially detecting illumination outside the image projection area on the screen 103 and thereby control maximum brightness of light emissions of all or each of pixels of the EL element 101 simultaneously with image projection.

Embodiment 3

Figure 5:
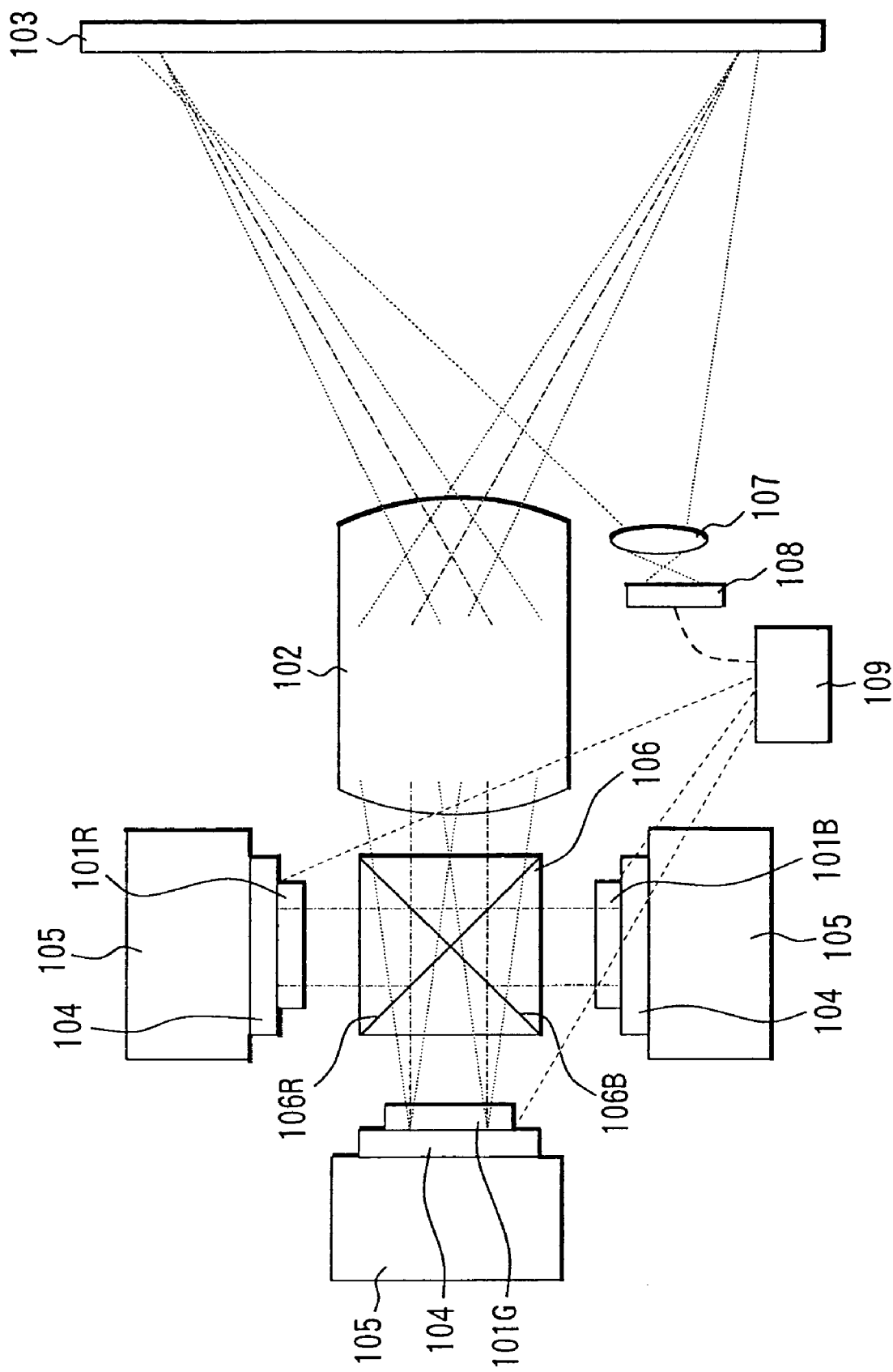
FIG. 5 is a schematic view of main parts of a projector according to Embodiment 3 of the present invention.

FIG. 5 is a sectional view of a main optical system of a projector which is Embodiment 3 of the present invention.

Reference numerals 101R, 101G and 101B denote organic EL elements that emit three primary colors (light beams) for displaying a color image using an additive process of red, green and blue colors respectively. These EL elements 101R, 101G and 101B have a plurality of pixels each transmitting image information as light pattern information. Detailed configurations of the EL element 101R, 101G and 101B will be explained later.

Then, the controller 109 electrically controls the EL elements 101R, 101G and 101B according to image signals from the image signal providing apparatus (reference character IP in FIG. 4). The EL elements 101R, 101G and 101B emit light that patterns the colors handled by the respective elements based on the electric signals from the controller 109.

The beams emitted from these EL elements 101R, 101G and 101B are color-combined by a wavelength-combining prism (color-combining prism) 106. The wavelength-combining prism 106 consists of a dichroic waveband separating film 106R that reflects the red light and transmits the cyan light and a dichroic waveband separating film 106B that reflects the blue light and transmits the yellow light, arranged in such a way as to cross each other and is generally called a "cross dichroic prism." Therefore, the green light transmits without being affected by the wavelength-combining prism 106.

Using this wavelength-combining prism 106 causes the light (image information light) emitted from the EL element 101R handling the red color to be deflected toward the projection lens 102 by the dichroic waveband separating film 106R and causes the light (image information light) emitted from the EL element 101B handling the blue color to be deflected toward the projection lens 102 by the dichroic waveband separating film 106B. On the other hand, the light emitted from the EL element 101G handling the green color advances toward the projection lens 102 without being deflected.

The three EL elements 101R, 101G and 101B are mechanically or electrically adjusted so that the beams from the corresponding pixels overlap with one another on the screen 103 with a predetermined accuracy.

In place of the wavelength-combining prism 106, a 3-piece prism or 4-piece prism which is generally used in a video received light color separation optical system can also be used as well as the above-described cross dichroic prism.

The color image information light combined by the wavelength-combining prism 106 is captured by the projection lens 102 and projected onto the screen 103. The surface of the screen 103 has a light diffusion characteristic and the observer can recognize the image by viewing the light diffused and reflected by this screen 103.

The screen 103 may be either of the above-described reflective type or a transmission type. In both cases, using the screen having at least a predetermined diffusion characteristic, the apparatus can function as a display apparatus which recognizes the image by directly viewing the screen 103.

Furthermore, as explained in Embodiment 2, each of the EL elements 101R, 101G and 101B is provided with a low temperature gradient surface of a Peltier element 104 placed in contact with its back and a high temperature gradient surface of the Peltier element 104 is cooled by a ventilation fan 105.

In this embodiment, a thermocouple (not shown) is provided in contact with each of the EL elements 101R, 101G and 101B and the controller 109 performs temperature control (that is, control over power to the Peltier elements 104) while monitoring the temperature detected by the thermocouples.

Furthermore, a condensing lens 107 is provided near the projection lens 102 and this condensing lens 107 condenses the ambient light illuminating the screen 103 onto a photoelectric conversion sensor 108 before the projector projects an image onto the screen 103. The output of the photoelectric conversion sensor 108 which indicates ambient illumination of the ambient light is sent to the controller 109 and stored as ambient illumination data. Based on this ambient illumination data, the controller 109 controls overall maximum light emission brightness of the EL elements 101R, 101G and 101B and maximum light emission brightness distribution of each pixel arranged in the EL elements 101R, 101G and 101B. The more specific control method will be explained later.

Furthermore, it is also possible to detect ambient illumination simultaneously with image projection onto the screen 103 by the projector by partially detecting illumination outside the image projection area on the screen 103 and thereby control maximum brightness of light emissions of all or each of pixels of the EL elements 101R, 101G and 101B simultaneously with image projection.

(EL Element)

Figure 6:
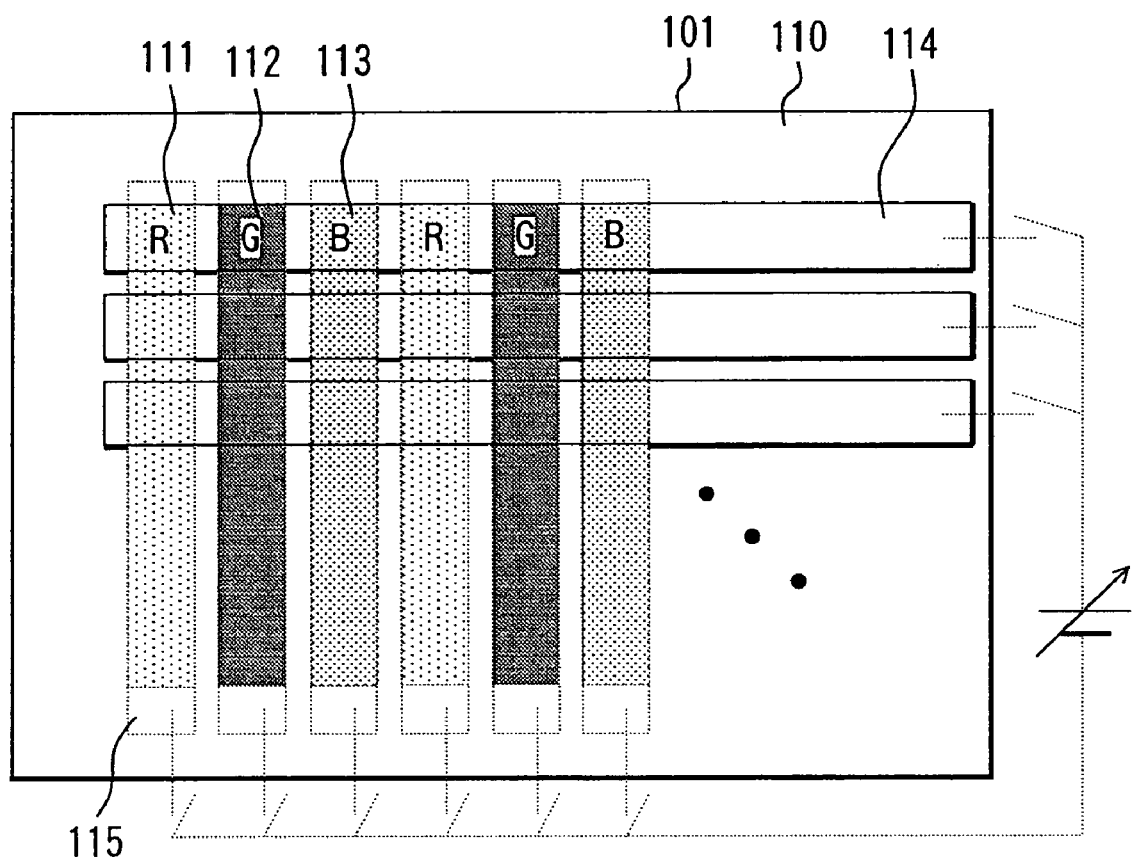
FIGS. 6(A) and 6(B) are schematic views of main parts of an EL element used in Embodiment 2.
Figure 6:
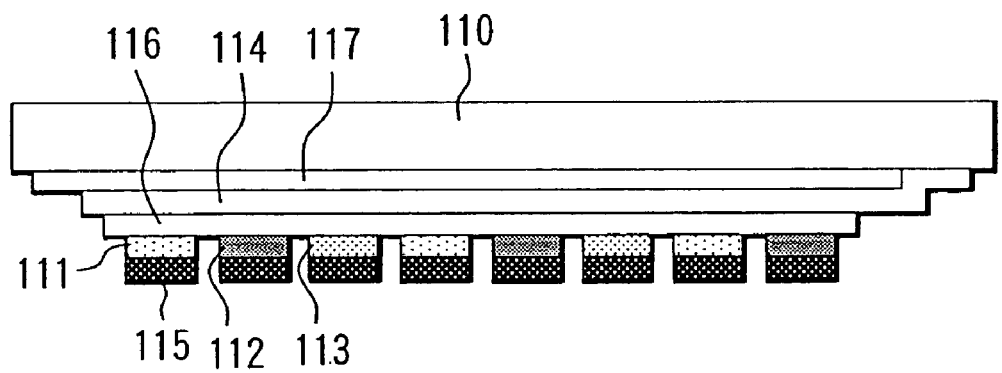

Then, the structure of the EL element 101 used in Embodiment 2 will be explained using FIG. 6(A) and 6(B). As shown in FIG. 6(B), the basic structure of the EL element 1 consists of a transparent glass substrate 110 as the base material and luminescent materials 111, 112 and 113 sandwiched between an ITO (indium-tin oxide) transparent thin film electrode 114 and metal thin film electrode 115. In order to efficiently inject hole carriers into the luminescent materials 111, 112 and 113, a hole transport layers 116 is placed between the ITO transparent thin film electrode 114 and luminescent materials 111, 112 and 113.

Furthermore, when used as a projection type modulation light source, for the purpose of increasing the ratio of capturing emitted light by the projection lens 102 and increasing photoelectric conversion efficiency, a light resonation structure is constructed of a dielectric multilayer reflecting half mirror layer 117 provided outside the ITO transparent thin film electrode 114 and the light reflection surface of the metal thin film electrode 115. In this way, resonance causes the light emission direction to have directivity in the direction perpendicular to the glass substrate 110 though the condition does not bring about an induced emission action. It also has a band narrowing effect on emission wavelength spectrum at the same time and the design of resonance distance allows the wavelength of emitted light to be set. The surface of light emission is on the transparent glass substrate 10 side.

This is the basic structure of the EL element 101 and each emission pixel is constructed of the ITO transparent thin film electrode 114 and metal thin film electrode 115 arranged in a wiring matrix form. While emitted light wavelength on the order of one nano-meter is adjusted by the distance between the resonant mirrors, emission colors such as red, green and blue are determined by a luminescent material. Then, the EL element 101 that expresses a full color image is realized by placing the luminescent material 111 handling red light, luminescent material 112 handling green light and luminescent material 113 handling blue light by turns.

On the other hand, patterning of the luminescent materials 111, 112 and 113 is generally performed using a method of coating a fluorescent material onto a substrate using a vapor deposition method. That is, to create the EL element 101 with three primary color emission pixels, parts requiring no coating are masked for each color by resist patterning, the luminescent materials of three primary colors (RGB) are coated sequentially by a lift-off method and a pattern can be thereby placed.

Figure 7:
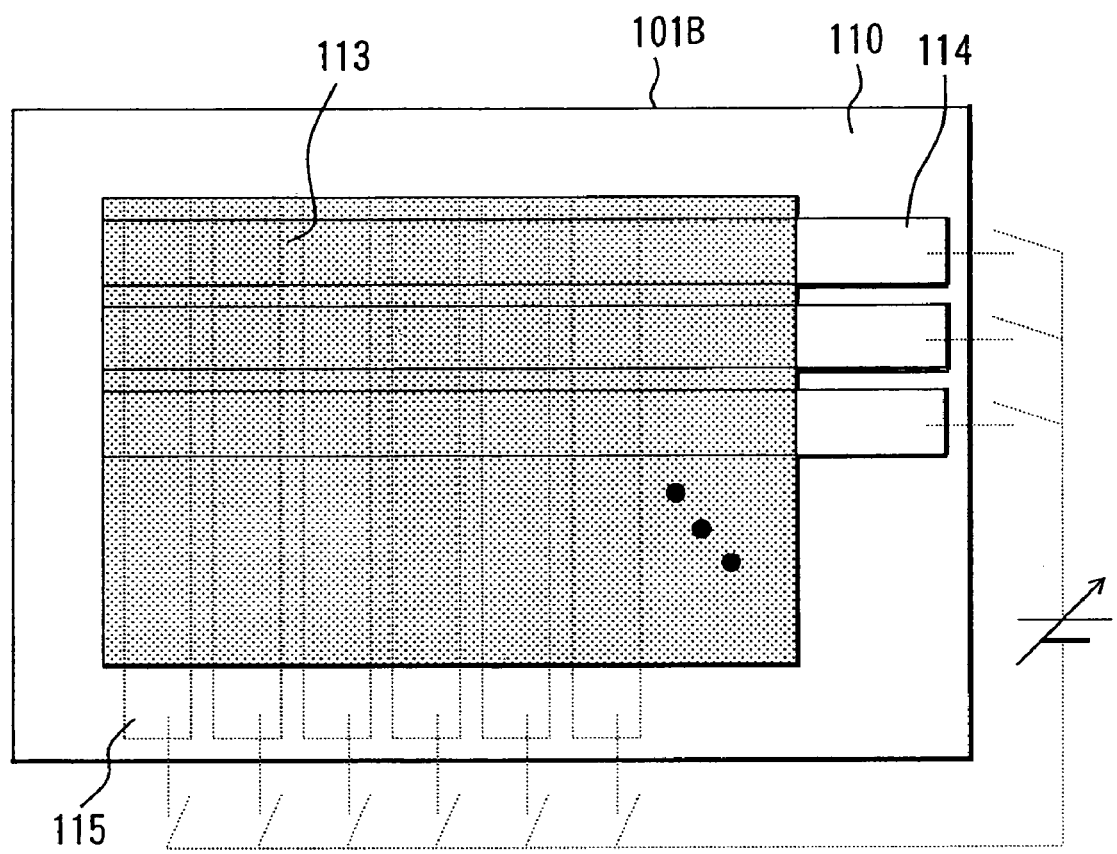
FIGS. 7(A) and 7(B) are schematic views of main parts of an EL element used in Embodiment 3.
Figure 7:
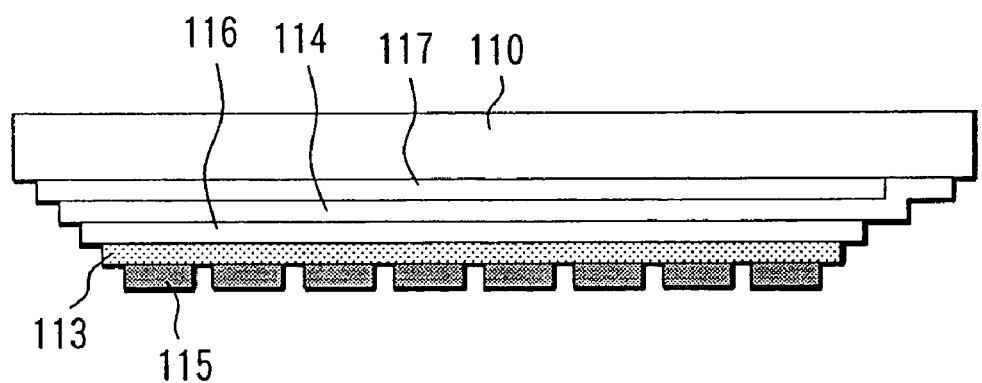

As shown in FIGS. 7(A) and 7(B), the structures of the EL elements 101R, 101G and 101B used in Embodiment 3 consist of those explained in Embodiment 2 without the structure in which the patterns of the luminescent materials of three primary colors are placed. The figure shows only the blue EL element 101B, but the other color EL elements are also constructed likewise.

The EL element 101R that emits red light is provided with the luminescent material 111 that emits red light and the EL element 101G that emits green light is provided with the luminescent material 112 that emits green light. Furthermore, the EL element 101B that emits blue light is provided with the luminescent material 113 that emits blue light.

Figure 8:
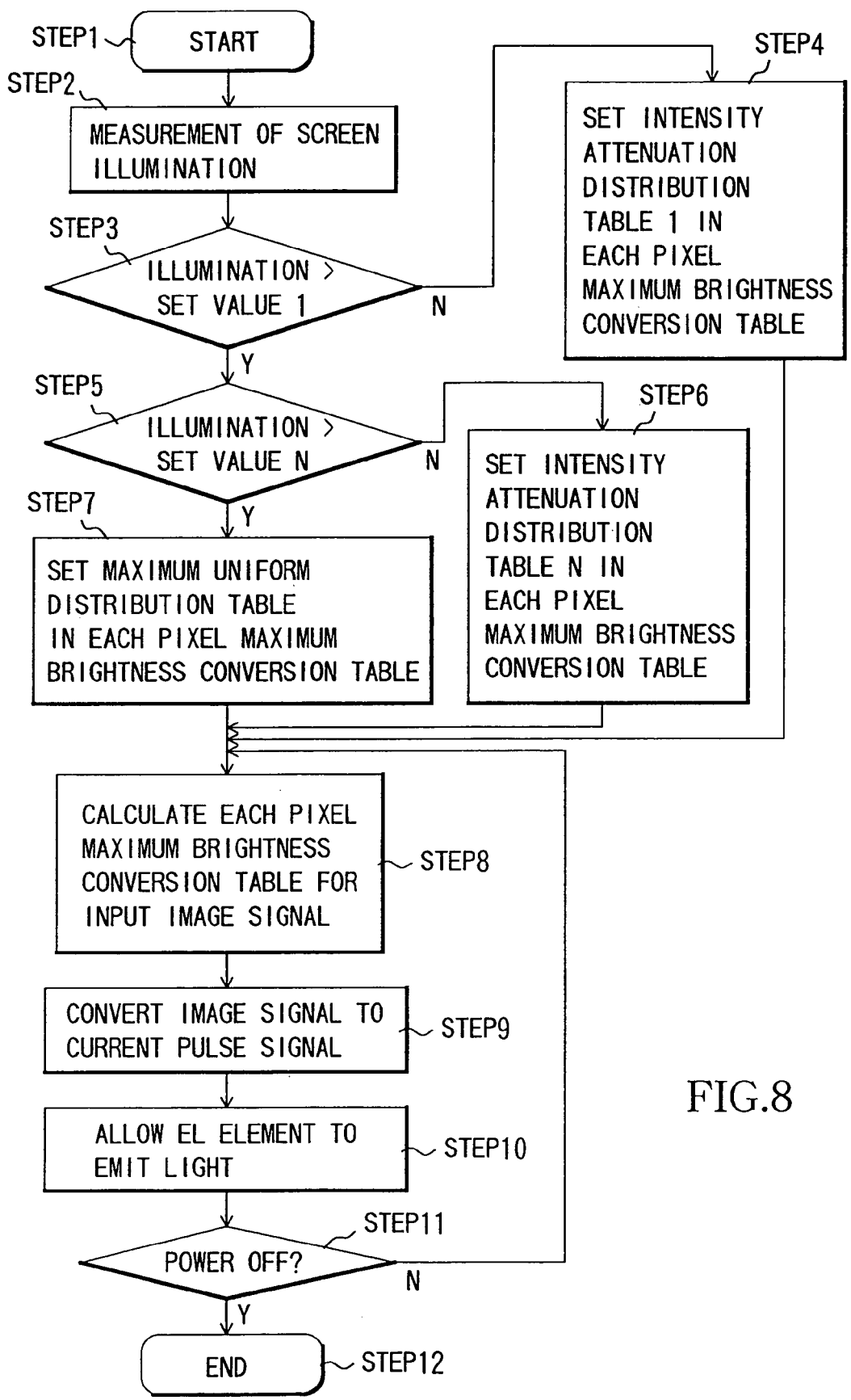
FIG. 8 is a flow chart illustrating a method of controlling a light emission state of the EL element in Embodiments 2 and 3 above.

Then, the method of controlling a light emission state of the EL elements according to the illumination environment in Embodiments 2 and 3 will be explained using the flow chart in FIG. 8. In the explanation here, the EL elements in Embodiments 2 and 3 will be expressed with reference numeral 101.

After stating with the power of the projector turned ON (step 1), the controller 109 detects an ambient illumination value of the screen 103 through the aforementioned condensing lens 107 and photoelectric conversion sensor 108 (step 2).

Then, the controller 109 decides to which of preset N states of brightness the detected ambient illumination value corresponds. If the detected ambient illumination value corresponds to an m-th ($N \leq m \leq 1$) state of brightness (ambient illumination), an m-th intensity attenuation distribution table m is set in a maximum brightness conversion table that corresponds to each pixel.

More specifically, the controller 109 decides whether the detected illumination is greater than a set value 1 (state of first brightness) or not (step 3) and if it is smaller than the set value 1, the controller 109 sets the intensity attenuation distribution table 1 in the maximum brightness conversion table of each pixel (step 4). On the other hand, if the detected illumination is greater than the set value 1, the controller 109 decides whether the detected illumination is greater than a set value N or not (step 5), and if it is smaller than the set value N, the controller 109 sets an intensity attenuation distribution table N in the maximum brightness conversion table of each pixel (step 6).

When the detected illumination is greater than the set value N, the controller 109 sets a maximum uniform distribution table in the maximum brightness conversion table of each pixel (step 7). This converts brightness in such a way that the EL element 101 is fully lighted at total maximum brightness of light emissions.

Then, the controller 109 converts and calculates values of the set maximum brightness conversion table of each pixel according to image signal data input from the image signal providing apparatus IP thereafter and the value in the maximum brightness conversion table corresponding to each pixel (step 8), and converts the image signal to a current pulse signal to drive and turn on the EL element 101 in a state corresponding to a predetermined maximum brightness distribution (step 9).

Thus, charges are injected into each pixel of the EL element 101, each pixel emits light in a pattern in accordance with the image signal (step 10) and the image is projected onto the screen 103. Then, when the power is turned OFF, this flow is completed (step 12) and if the power is not turned OFF, the controller moves back to step 8 (step 11).

On the other hand, the N maximum brightness conversion tables of each pixel show a brightness distribution such that overall brightness is low when the detected ambient illumination is the lowest and the amount of reduction in off-axis transmitted light of the projection lens 102 is corrected so that the screen illumination distribution becomes uniform. It is set in such a way that as the detected ambient illumination increases, the overall brightness increases gradually and the brightness distribution approximates to a uniform flat distribution.

Furthermore, as described above, when ambient illumination is high and higher than the comparable illumination set value N, the EL element 101 is in an ON state at maximum settable brightness and the brightness distribution becomes a uniform illumination distribution.

This embodiment controls the overall brightness of light emissions and brightness distribution of the EL element 101 in multi-step form with respect to ambient illumination, but it may also be adapted so as to control the overall brightness of light emissions and brightness distribution in a stepless way (continuously) with respect to ambient illumination. It may also be adapted so that the overall brightness of light emissions and brightness distribution are switched between two stages; when ambient illumination is higher than a predetermined threshold and when ambient illumination is lower than the predetermined threshold.

Here, the human visual characteristic shows light adaptation and dark adaptation according to the brightness of the environment around the screen. Thus, when a displayed image is observed in a dark environment, darkness which would be recognized as dark in a bright environment may not be felt dark and when an excessively bright image is displayed in a dark environment, the environment is illuminated by scattered light from the screen, deteriorating the sense of absorption into the displayed image. It is therefore preferable to take into consideration the human visual characteristic and project and display images in a visual dynamic range area including the brightness of the environment.

Furthermore, the human visual characteristic also has color adaptation reaction, and therefore a color temperature or color varies when an image is displayed in an environment under illumination with an incandescent lamp and when an image is displayed in an environment under illumination with a fluorescent lamp. Thus, by detecting the color of ambient illumination and changing the brightness ratio among the EL elements handling three primary colors of red, green and blue or the brightness ratio among the respective color pixels within the EL elements, it is possible to obtain an appropriate color reproduction state of a displayed image.

As described above, when a dark image is displayed in a dark environment, this embodiment attaches importance to the uniformity of illumination of the projected image and further color reproducibility. On the other hand, when a bright image is displayed in a bright environment, this embodiment attaches importance to the brightness of the projected image. In this way, this embodiment can improve the quality of the projector.

Then, the action of low brightness lighting due to deterioration of photoelectric conversion efficiency of the EL element will be explained. Here, the EL elements according to Embodiments 2 and 3 will also be explained with reference numeral 101 assigned thereto.

An organic electroluminescence fluorescent material used for the above-described organic EL electroluminescence elements is constructed of a blue luminous body, green luminous body and red luminous body. Benzoxazole zinc complex is used as the blue luminous body, aluminum quinolinole complex is used as the green luminous body and DCM, etc., is used as the red luminous body.

As a fluorescent material, there is a material that can provide light energy of 18.4 $mW/cm^2$ when charge carriers of 100 $mA/cm^2$ are supplied in an environment with a room temperature of approximately 23° C., provide an amount of emitted light of 5000 $cd/m^2$ with green color and have a half attenuation time of photoelectric conversion efficiency of several thousand hours.

Here, when the organic EL element is used as an image modulation element for direct light emission of the projector, the above-described brightness of light emissions is not sufficient, and therefore it is necessary to inject more than 100 $mA/cm^2$ of charge carriers to form excitons. As a result, thermal energy in the luminescent layer of the fluorescent material of the EL element rises, which increases the probability that the organic fluorescent material which is the luminescent material will be excited into an active state, causes collapse of organic molecules of the fluorescent material and thereby accelerates deterioration of photoelectric conversion efficiency.

Thus, from a macroscopic viewpoint, by controlling the whole EL element 101 using the Peltier element 104 provided on the back of the EL element 101 to approximately 20° C., this embodiment reduces image illumination in image projection onto the screen 103 under dark ambient illumination while keeping the half attenuation time of photoelectric conversion efficiency to several thousand hours when the EL element 101 is fully lit at overall maximum brightness of light emissions, thereby reduces the amount of charge carriers injected into the EL element 101 and suppresses a temperature rise of the EL element 101. This extends the half attenuation time of the photoelectric conversion efficiency of the EL element 101.

When the EL element performs full lighting in a bright environment with image display illumination in a pitch-dark environment set to a half value of the maximum light emission brightness value, there is also an influence of a temperature gradient between the cooling surface of the Peltier element 104 and the fluorescent material layer of the EL element 101 and it has been proven experimentally that it is possible to obtain a half attenuation time of approximately triple photoelectric conversion efficiency. Therefore, when it is assumed that the apparatus is used half in a dark environment and half in a bright environment, the half attenuation time of photoelectric conversion efficiency extends to 1.5 times that in the case where it is fully lighted at a maximum light emission brightness value. Furthermore, since the image displayed when the projector is actually driven is not fully lighted in white all the time, the heat value of the EL element 101 is also suppressed.

In consideration of these circumstances, assuming that average brightness of light emissions which is an average value of the actual amount of modulation is half the maximum light emission brightness value, the effect that the half attenuation time of photoelectric conversion efficiency will be extended to approximately 3 times due to this actual modulation factor is likewise expected. Therefore, by cooling the EL element 101 to approximately 20° C., a half attenuation time of photoelectric conversion efficiency of approximately several thousand hours is obtained in light emission state of the EL element 101 with the maximum light emission brightness. Then, half attenuation time of photoelectric conversion efficiency of the EL element becomes approximately 1.5 times when the time of operating the apparatus in a dark environment is assumed to be a half value and approximately 3 times under the influence of the actual modulation factor. Assuming that the half attenuation time of photoelectric conversion efficiency when the EL element itself is fully lighted in a 20° C. environment is 2000 hours, it is possible to extend the half attenuation time of photoelectric conversion efficiency to 9000 hours when the projector is actually used.

As described above, aforementioned Embodiments 2 and 3 reduce the overall maximum brightness of light emissions of the EL elements as the illumination environment becomes darker, adjust the distribution of maximum brightness of light emissions of each pixel in the EL element so that the illumination distribution for the object becomes uniform, projects images more brightly in a bright using environment, make uniform illumination of the projected image in a dark using environment and can thereby improve the quality of the projector. It is also possible to reduce power supplied to the organic EL element, reduce a temperature rise of the EL element and slow down the chemical reaction speed of the organic fluorescent material. Therefore, it is possible to delay deterioration of the photoelectric conversion efficiency and extend the quality maintenance period of the projector.

As the method for cooling the EL element, it is also possible to use a method of carrying out thermal diffusion/dispersion using metal with high thermal conductivity or ceramics instead of the method of using a Peltier element and cool the element by ventilation or circulation or a liquid coolant.

Furthermore, the configurations shown in Embodiments 1 and 2 are not limited to a projector, but are also applicable to a head mounted display or head up display, etc., used to observe virtual images of an EL element.

While preferred embodiments have been described, it is to be understood that modification and variation of the present invention may be made without departing from scope of the following claims.

What is claimed is:

1. A projection type image display apparatus comprising:
   an electroluminescence element which has a plurality of pixels that can each emit modulated light;
   a projection optical system which projects the light emitted from each of the pixels in the electroluminescence element onto an object to display an image;
   a sensor which detects brightness of ambient light that illuminates the object; and
   a controller which controls brightness of the light emitted from the electroluminescence element based on the brightness of the ambient light, wherein
   the controller reduces overall maximum brightness of the light emitted from the electroluminescence element in such a way that the amount of light projected onto the object is reduced as the brightness of the ambient light decreases.

2. The projection type image display apparatus according to claim 1, wherein the controller corrects a distribution of maximum brightness of the light emitted from each pixel of the electroluminescence element so that the amount of light projected onto the object is distributed uniformly in the entire projection area as the brightness of the ambient light decreases.

3. The projection type image display apparatus according to claim 1, wherein the controller controls the overall maximum brightness of the light emitted from the electroluminescence element by modulating a peak current value or a current pulse time width supplied to the electroluminescence element.

4. The projection type image display apparatus according to claim 1, wherein the controller corrects the distribution of the maximum brightness of the light emitted from each of the pixels by modulating a current pulse time width or peak current value supplied to each pixel of the electroluminescence element.

5. The projection type image display apparatus according to claim 1, wherein the electroluminescence element comprises emission pixels of three primary colors arranged in repetitive matrix form and displays an additive color mixture image.

6. The projection type image display apparatus according to claim 1, further comprising:
   three electroluminescence elements which emit three primary colors, respectively; and
   a wavelength-combining element which includes a dichroic waveband separating film and combines color beams emitted from the three electroluminescence elements,
   wherein the light combined by the wavelength-combining element is projected onto the object through the projection optical system to display an additive color mixture image.

7. The projection type image display apparatus according to claim 1, wherein, in the electroluminescence element, excitons are formed by injecting charge carriers into a luminescent layer which has a material including an organic fluorescent material, and modulation pixels that emit light by recombination of the excitons are arranged two-dimensionally.

8. The projection type image display apparatus according to claim 7, wherein a resonance structure of photons generated is formed of a charge carrier injection electrode film and a light reflecting film provided on the outer surface of the electrode film in the electroluminescence element.

9. An image display system comprising:
the projection type image display apparatus according to claim 8; and
a screen onto which the projection type image display apparatus projects an image,
wherein an image projected on the screen is recognized by an observer by means of diffused light that has been reflected by the screen and has predetermined directivity.

10. An image display system comprising:
the projection type image display apparatus according to claim 8; and
a screen onto which the projection type image display apparatus projects an image,
wherein an image projected on the screen is recognized by an observer by means of diffused light that has been transmitted through the screen and has predetermined directivity.

11. A display device comprising:
an electroluminescence element which has a plurality of pixels that can each emit modulated light;
a display which displays an image by using the light emitted from each pixel in the electroluminescence element;
a sensor which detects brightness of ambient light that illuminates the display; and
a controller which controls brightness of the light emitted from the electroluminescence element based on the brightness of the ambient light, wherein
the controller reduces overall maximum brightness of the light emitted from the electroluminescence element as the brightness of the ambient light decreases.

\* \* \* \* \*

UNITED STATES PATENT AND TRADEMARK OFFICE
CERTIFICATE OF CORRECTION

| | |
|---|---|
| PATENT NO. | : 7,090,356 B2 |
| APPLICATION NO. | : 10/998648 |
| DATED | : August 15, 2006 |
| INVENTOR(S) | : Jun Koide |

It is certified that error appears in the above-identified patent and that said Letters Patent is hereby corrected as shown below:

<u>COLUMN 1</u>:

Line 24, "aperture." should read --aperture--.

Signed and Sealed this

Eleventh Day of March, 2008

JON W. DUDAS
*Director of the United States Patent and Trademark Office*